(12) United States Patent
Mansuy

(10) Patent No.: US 9,170,415 B2
(45) Date of Patent: Oct. 27, 2015

(54) HEADWARE MOUNTABLE OPTICAL DEVICE

(71) Applicant: Gerald Mansuy, Davenport, FL (US)

(72) Inventor: Gerald Mansuy, Davenport, FL (US)

(*) Notice: Subject to any disclaimer, the term of this patent is extended or adjusted under 35 U.S.C. 154(b) by 25 days.

(21) Appl. No.: 14/046,590

(22) Filed: Oct. 4, 2013

(65) Prior Publication Data

US 2015/0098141 A1   Apr. 9, 2015

(51) Int. Cl.
  *G02B 7/02*   (2006.01)
  *G02B 25/00*  (2006.01)
  *G02B 7/00*   (2006.01)
  *A42B 1/24*   (2006.01)

(52) U.S. Cl.
  CPC .............. *G02B 25/005* (2013.01); *A42B 1/247* (2013.01); *G02B 7/002* (2013.01)

(58) Field of Classification Search
  USPC .................................................. 359/811–830
  See application file for complete search history.

(56) References Cited

U.S. PATENT DOCUMENTS

| 1,212,842 A | 1/1917 | Stronge |
| 4,869,575 A * | 9/1989 | Kubik ............................. 345/8 |
| 7,340,781 B2 * | 3/2008 | Clark ........................... 2/209.13 |
| 2006/0268220 A1 * | 11/2006 | Hogan ............................ 351/47 |

* cited by examiner

*Primary Examiner* — Mohammed Hasan
(74) *Attorney, Agent, or Firm* — Avery N. Goldstein, Esq.; Blue Filament Law, PLLC

(57) ABSTRACT

A removable optical loupe that is mountable to headwear is provided. The inventive loupe is configured to clip on to the brim of a hat, or the bill of a cap or visor. Embodiments of the inventive loupe have a pivoting joint for positioning the lens of the optical loupe into and out of the line of sight when not in use. The lens of the inventive optical loupe is used for magnifying objects for inspection.

18 Claims, 3 Drawing Sheets

HEADWARE MOUNTABLE OPTICAL DEVICE

FIELD OF THE INVENTION

The present invention in general relates to optical devices and in particular to a clip on loupe that mounts to headwear.

BACKGROUND OF THE INVENTION

A loupe is a small magnification device used to see small details more closely. Unlike a magnifying glass, a loupe does not have an attached handle, and its focusing lens(es) are contained in an opaque cylinder or cone, or fold into an enclosing housing that protects the lens(es) when not in use. Loupes are also called hand lenses.

Loupes are used in a number of industries, notably the jewelry trade, watchmaking, photography, printing, dentistry, education and ophthalmology. Loupes are also used in academia and life sciences, such as geology and biology, as well as by hobbyists for inspecting stamps and coins. Amateur naturalists may also find a hand lens or a loupe a useful tool when looking at or identifying species.

While there are many existing loupe designs, there still exists a need for a removable loupe that is mountable to headwear.

SUMMARY OF THE INVENTION

A removable optical loupe is provided that is mountable to headwear. The inventive loupe is configured to clip on to the brim of a hat, or the bill of a cap or visor. Embodiments of the inventive loupe have a pivoting joint for positioning the lens of optical loupe into and out of the line of sight when not in use. The lens of the inventive optical loupe is used for magnifying objects for inspection.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention

DESCRIPTION OF THE INVENTION

The present invention has utility as a removable optical loupe that is mountable to headwear. The inventive loupe is configured to clip on to the brim of a hat, or on the bill of a cap or visor and finds particular utility as an accessory in golf and target sports. Embodiments of the inventive loupe have a pivoting joint for positioning the lens of optical loupe into and out of the line of sight when not in use. The lens of the inventive optical loupe is used for magnifying objects for inspection.

Figure 1:
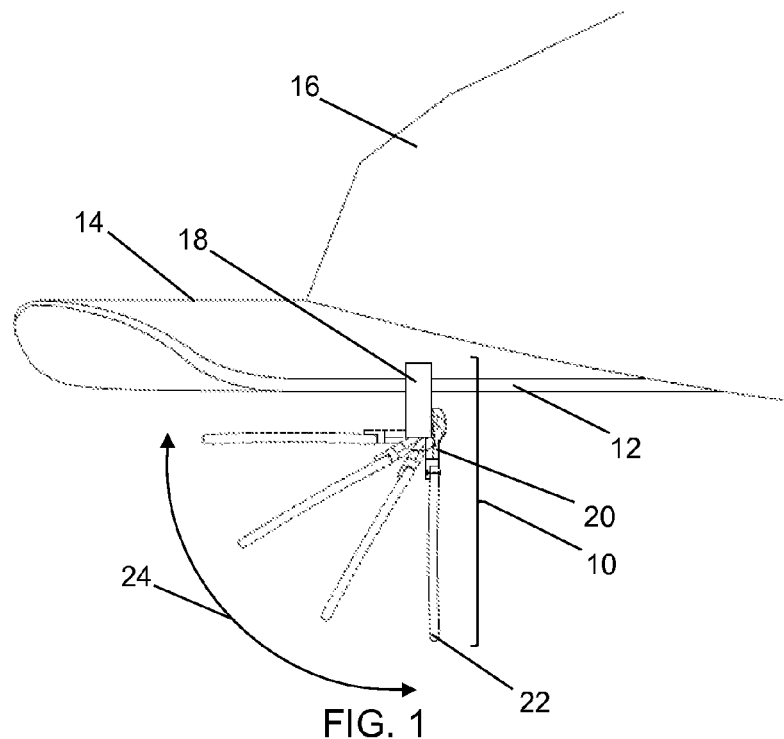
FIG. 1 is a side perspective view of the inventive clip on optical loupe removeably attached to the bill of a cap according to an embodiment of the invention.
Figure 2:
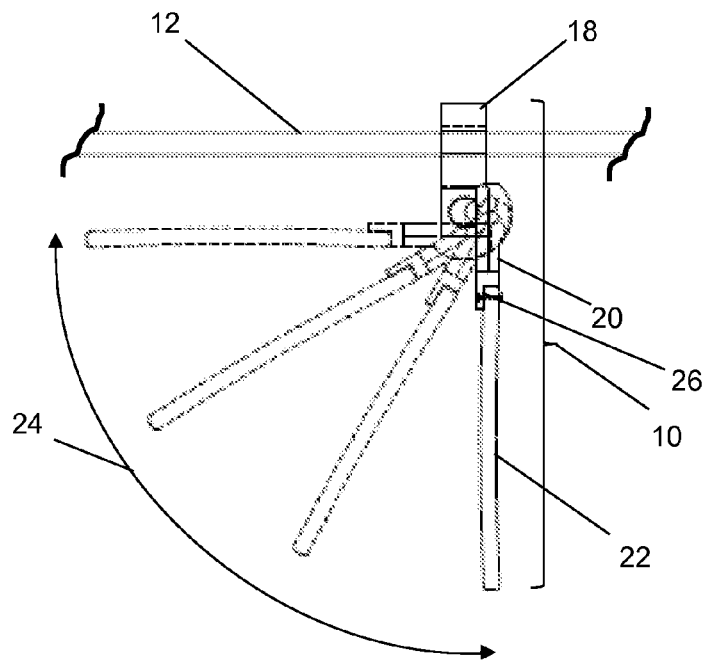
FIG. 2 is a detailed close up perspective view of the inventive clip on optical loupe of FIG. 1 according to an embodiment of the invention.

Referring now to the figures, FIG. 1 is a side perspective view of the inventive clip on optical loupe 10 removeably attached to the bill 14 of a cap 16 according to an embodiment of the invention. It is noted that the inventive clip on optical loupe 10 is operative with other forms of headwear as well. A clip 18 attaches to the edge 12 of the bill 14 so as to position the optical loupe 10 in the line of sight of a user. The clip 18 is moveably attached to a lens holder 20 via a socket like connection to be described further in FIGS. 3-5. Arrow 24 is used to indicate the full range of motion of the lens 22. When the lens 22 is positioned in the up position, the lens 22 is parallel to the bill 14, and is out of the user's vision field. Conversely, when the lens 22 is positioned in the down position, the lens 22 is perpendicular to the bill 14, and is in the user's vision field. FIG. 2 is a close up view of FIG. 1 that illustrates the pivoting motion of the lens 22.

Figure 3:
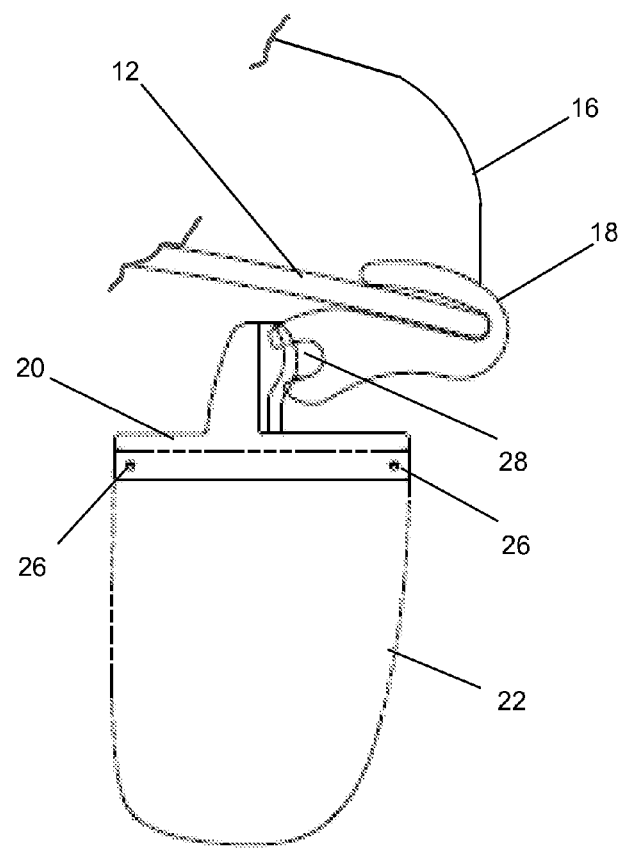
FIG. 3 is a front perspective view of the inventive clip on optical loupe of FIG. 1 according to an embodiment of the invention.
Figures 4A, 4B, 4C, 4D:
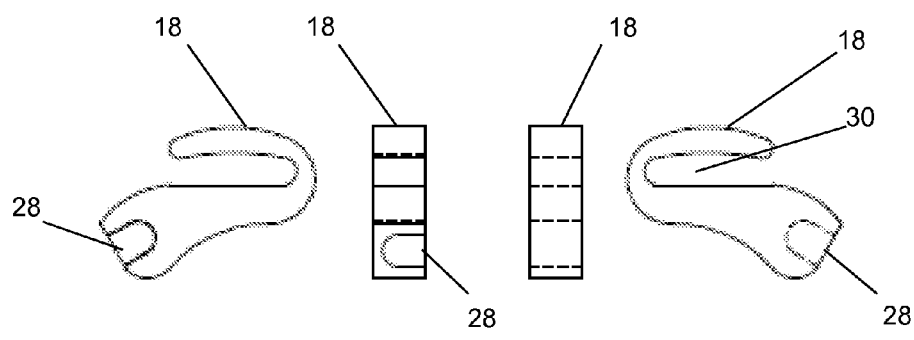
FIGS. 4A-4D are a series of perspective views of the clip portion of the inventive clip on optical loupe of FIG. 1 according to an embodiment of the invention.

FIG. 3 is a front perspective view of the inventive clip on optical loupe 10 deployed in the downward position in the user's field of vision. Fasteners 26, such as pins or screws attach and retain the lens 22 to lens holder 20 that engages into ball socket/slot 28 of clip 18.

Figure 5A:
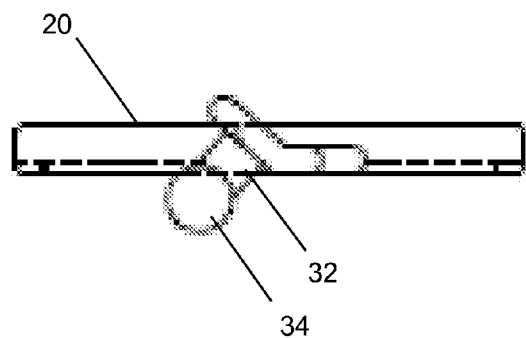
FIGS. 5A-5C are a series of perspective views of the lens holder portion of the inventive clip on optical loupe of FIG. 1 according to an embodiment of the invention.
Figure 5B:
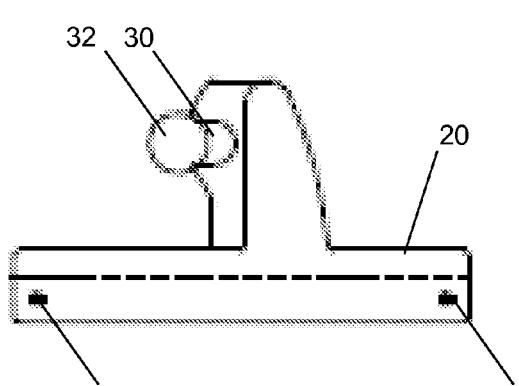
Figure 5C:
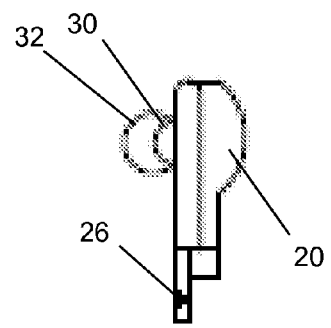

FIGS. 4A-4D are a series of perspective views of the clip 18 showing the front, front side, back side, and back of the clip, respectively. Elongated slot 30 engages a hat brim or cap bill. FIGS. 5A-5C are a series of perspective views of lens holder 20 showing the bottom side, back side, and side view of the lens holder 20, respectively. Ball joint 34 extending from arm 32 mounts into slot 28 of clip 18, and allows for up and down positioning of the lens 22, as well as to swivel or rotate the lens 22 sideways. The clip 18 and lens holder 20 may be made of plastic, composites, wood, metals, or combinations thereof.

The foregoing description is illustrative of particular embodiments of the invention, but is not meant to be a limitation upon the practice thereof. The following claims, including all equivalents thereof, are intended to define the scope of the invention.

The invention claimed is:

1. An optical device comprising: a clip with an elongated slot with an open end configured to engage a brim or a bill extending from a form of headwear; and a lens retained by a holder, said holder movably engaged to said clip; wherein said clip further comprises a socket that engages a ball joint extending from said holder, said socket when engaged with said ball joint allows for upward and downward positioning of said lens with respect to said headwear into and out of a line of sight of said user.

2. The optical device of claim 1 wherein said lens is used for magnification.

3. The optical device of claim 1 wherein said headwear is a hat further comprising said brim for attachment to said elongated slot of said clip.

4. The optical device of claim 1 wherein said headwear is a cap further comprising said bill for attachment to said elongated slot of said clip.

5. The optical device of claim 1 wherein said headwear is a visor further comprising said bill for attachment to said elongated slot of said clip.

6. The optical device of claim 1 wherein said lens is retained by said holder via a set of pins or screws.

7. The optical device of claim 1 wherein said clip and said holder are made of at least one of plastic, composites, wood, or metals.

8. A method for using the optical device of claim 1 comprising:
   attaching said optical device to a user's headwear with said clip; and
   positioning said lens into the line of sight of said user.

9. The method of claim 8 wherein said headwear is a cap and said clip is engaged with a bill extending from said cap.

10. The method of claim 8 wherein said headwear is a visor and said clip is engaged with a bill extending from said visor.

11. The method of claim 8 wherein said headwear is hat and said clip is engaged with a brim extending from said hat.

12. An optical loupe configured to clip on to headwear, said loupe comprising: a clip with an elongated slot with an open end configured to engage a brim or a bill extending from a form of said headwear; and a single lens retained by a holder, said holder movably engaged to said clip; wherein said clip further comprises a socket that engages a ball joint extending from said holder, said socket when engaged with said ball joint allows for upward and downward positioning of said lens with respect to said headwear into and out of a line of sight of said user.

13. The optical loupe of claim 12 wherein said lens is used for magnification.

14. The optical loupe of claim 12 wherein said headwear is a hat further comprising a brim for attachment to said elongated slot of said clip.

15. The optical loupe of claim 12 wherein said headwear is a cap further comprising a bill for attachment to said elongated slot of said clip.

16. The optical loupe of claim 12 wherein said headwear is a visor further comprising a bill for attachment to said elongated slot of said clip.

17. The optical loupe of claim 12 wherein said lens is retained by said holder via a set of pins or screws.

18. The optical loupe of claim 12 wherein said clip and said holder are made of at least one of plastic, composites, wood, or metals.

\* \* \* \* \*